United States Patent [19]

Feuge et al.

[11] 4,377,686

[45] Mar. 22, 1983

[54] METHOD OF PURIFYING FATTY ACID ESTER PRODUCTS

[75] Inventors: Reuben O. Feuge, New Orleans; Hampden J. Zeringue, Jr., Destrehan, both of La.

[73] Assignee: The United States of America as represented by the Secretary of Agriculture, Washington, D.C.

[21] Appl. No.: 223,509

[22] Filed: Jan. 8, 1981

[51] Int. Cl.[3] .......................... C11C 3/02; C09F 5/08; C09F 3/00; B01F 17/30

[52] U.S. Cl. .................................... 536/119; 260/410; 260/410.7; 252/182; 252/356; 252/357; 536/115

[58] Field of Search ...................... 252/356, 367, 182; 260/410.7, 410 R; 536/115, 119

[56] References Cited

U.S. PATENT DOCUMENTS 3,714,144 1/1973 Feuge et al. ........................ 536/119

4,104,464 8/1978 James .............................. 260/410.7

FOREIGN PATENT DOCUMENTS 53-17575 6/1978 Japan .................................. 536/119

OTHER PUBLICATIONS

Osipow, Lloyd I., et al., J. of Amer. Oil Chem. Soc., vol. 44, pp. 307-309, 1967.

Zeringue, H. J., Jr., et al., J. Amer. Oil Chem. Soc., vol. 53, pp. 567-571 and 719-721, 1976.

Placek, Chester, et al., Ind. & Engin. Chem., vol. 49, No. 2, Feb. 1957, pp. 162-170.

*Primary Examiner*—H. S. Cockeram

*Attorney, Agent, or Firm*—M. Howard Silverstein; David G. McConnell; Raymond C. Von Bodungen

[57] ABSTRACT

The alkali metal salts of fatty acids (soaps) remaining in fatty acid ester products after interesterification and other processing steps are decomposed by dissolving the fatty acid ester product in a suitable solvent, adding water, saturating the mixture with carbon dioxide, removing the water phase containing excess carbon dioxide and bicarbonate of the alkali metal, converting the bicarbonate into carbonate, and using the carbonate in refining, interesterification and other reactions in the processing of fatty acid esters.

5 Claims, No Drawings

METHOD OF PURIFYING FATTY ACID ESTER PRODUCTS

BACKGROUND OF THE INVENTION (1) Field of the Invention

This invention relates to the purification of fatty acid ester products.

(2) Description of the Prior Art

Sucrose esters have been prepared commercially for years by the transesterification of sugars with fatty acid esters in the presence of a basic transesterification catalyst. Reuben O. Feuge, et al, disclosed in U.S. Pat. No. 3,714,144, a process for producing sucrose esters of fatty acids having from 2 to 22 carbon atoms. The Feuge process comprises melting and mixing sucrose with esters of the fatty acids and a catalyst consisting of the alkali-free soaps of saturated or unsaturated fatty acids or mixtures thereof, reacting under vacuum to remove the alcohol or alcohol-like portions of the fatty acid esters, etc., removing the unreacted sucrose, and either removing the soap or soaps or acidifying them and removing the alkali metal portions. Use of the soaps both as catalysts and solubilizers is essential in the esterification of molten sucrose with glycerides of fatty acids, and the sugar-ester products resulting from the reaction normally contain 10% to 20% soaps.

Other processes for preparing sucrose esters of fatty acids which have been proposed result in reaction products containing 30% or more of soaps. One of these other processes was devised by Lloyd D. Osipow and William Rosenblatt (see Journal of the American Oil Chemists Society, vol. 44, pages 307–309, 1967).

The problem of economically removing unwanted soaps from sucrose-ester products is a major deterrent in the increased utilization of sucrose esters as emulsifiers. What is sorely needed is an economically feasible method of removing the soaps or their degradation products in the manufacture of sucrose-ester products. Free fatty acids in a sucrose ester product intended for use in foods are not as objectionable as soaps. Also, free fatty acids can be removed from sucrose-ester products by ultrafiltration or selective adsorption. (See H. J. Zeringue, Jr., and R. O. Feuge's article in the Journal of the American Oil Chemists Society, vol. 53, pages 567–571 and pages 719–721, 1976.)

Other processes employed in the manufacture of edible fat and oil products (glyceride esters) involve soaps and their removal. In the manufacture of monoglycerides by the interesterification of a fat or oil with glycerol it is customary to use sodium hydroxide as a catalyst, which results in the presence of about 1% soaps in the reaction product. Edible fats and oils are commonly refined by mixing with aqueous solutions of sodium hydroxide or sodium carbonate. The resulting soaps and some other impurities are removed from the oil or fat as soapstock, but the refined fat or oil still contains a minute amount of soaps which are normally removed by water washing. Disposal of this wash water without polluting the environment has been a problem. An economical process for decomposing these dilute soaps so as to permit reuse of the water and use of the products resulting from the decomposition of the soaps would be a boon to the oil and fat processing industry.

It is well known that carbon dioxide in water reacts with alkaline compounds and that sodium bicarbonate in a water solution decomposes to sodium carbonate as carbon dioxide is removed. It is also known by those skilled in the art that mixing aqueous sodium bicarbonate solution with a glyceride oil containing free fatty acids results in the formation of some soaps, but a large proportion of the free fatty acids does not react. Carbon dioxide at atmospheric pressure when added to a fatty acid ester containing soaps, even in the presence of dissolved water, will degrade the soaps only to a very limited extent, and subsequent filtration will not separate any degradation product or residual soap. As one example, Chester Placek and George W. Holman (Industrial and Engineering Chemistry, vol. 49, No. 2, February 1957, pages 162–170) state that the addition of carbon dioxide to interesterified lard to kill the alkaline catalyst resulted in the formation of soaps. The carbon dioxide and water did not decompose the soaps to form free fatty acids.

The efficacy of carbon dioxide and water in decomposing soaps differs greatly from that of relatively strong organic acids, such as citric acid, and strong inorganic acids, such as hydrochloric and sulfuric. Carbonic acid (carbon dioxide and water) is far from being equal to citric acid in decomposing soaps. The first stage of ionization of citric acid at 0.1 molar concentration is 40 times that of carbonic acid at the same concentration. But only 0.04 mole of carbon dioxide will dissolve in a liter of water at room temperature, and not all of this carbon dioxide will form carbonic acid. On the other hand, about 3 moles of citric acid will dissolve in a liter of water. Under some conditions, the addition of carbonic acid (carbon dioxide and water) to a soap solution will form bicarbonate and free fatty acids; but under other conditions, the same bicarbonate and free fatty acids react to form carbonic acid and soap. Reasonable completion of the reaction with carbonic acid in either direction depends on a complex interplay of concentrations, solubilities, reactivies, and equilibria.

In the instant invention we have found a set of conditions under which carbon dioxide in water at atmospheric pressure decomposes substantially all of the soaps present in a fatty acid ester product and permits removal of the alkali metal ions as bicarbonates and carbonates, which can be reused to form soaps in the course of other processing of fatty acid ester products.

SUMMARY OF THE INVENTION

A process for purifying fatty acid ester products containing the soap of an alkali metal is disclosed. A quantity of fatty acid ester product which contains an alkali metal of a fatty acid the concentration weight ratio of solvent to fatty acid ester product being in the range of about 1:1 to 14:1 is dissolved in a water-immiscible organic solvent at about 20°–50° C. The dissolved product solution is mixed with a quantity of water sufficient to form a second, aqueous phase, the volume ratio of said aqueous phase to organic phase being in the ratio of about 1/3:1 to 1:1. While the resultant organic and aqueous phases are in contact with each other, the two phases are mixed and saturated with carbon dioxide. The aqueous phase is then separated from the organic phase. The solvent is removed from the organic phase and a purified fatty acid ester product results.

DESCRIPTION OF THE PREFERRED EMBODIMENTS

An ester product containing alkali metal soap of a fatty acid containing 2 to 22 carbon atoms is diluted with a readily distillable solvent, selected from the group consisting of a hydrocarbon, an alcohol substantially insoluble in water, and a low molecular weight ester. However, in the instant invention, the following products were used: a sucrose ester product and a glyceride oil, each containing alkali metal salts of fatty acids. The function of the solvent is to decrease the viscosity of the ester product, enhance the rate of reaction and degree of completion of the reaction, and ensure the components of the reaction product being and remaining in the liquid state at or moderately above ambient temperature. Water is then added to the ester product-solvent solution. The three components (ester product, solvent, and water) are mixed continuously while carbon dioxide is passed into the mixture in an excess over that required to react with the soaps and saturate the components. The mixing of the three components is stopped when saturation of the liquid phases with $CO_2$ has been accomplished and the reaction between carbonic acid and soaps has come to equilibrium. The aqueous phase containing as carbonate and bicarbonate the alkali metal ions originally combined as soaps in the ester product is withdrawn. Removing the excess carbon dioxide from the aqueous phase results in the formation of alkali metal carbonates which can be used in any of a number of operations in the processing of glyceride oils and other esters of fatty acids.

The use of carbon dioxide to decompose soaps can be employed in purifying vegetable oils which have been refined with alkali and still contain traces of soaps. The instant invention can be used in vegetable oil processing plants where water effluents containing residual soaps may present pollution problems. Obviously, this invention is of particular consequence in this era of concern with environmental pollution.

Considerable choice can be exercised in selecting an organic solvent to be used in the purification process. The requirements being that the solvent has limited or practically no solubility in water, that it be chemically inert towards the other components of the system under the operating conditions employed, that it be a poor solvent for the bicarbonates of the alkali metals, that it be a good solvent for the fatty product at the operating temperature, that it lower the viscosity of the fatty product, and that it be readily removable from the fatty product by distillation or evaporation. 1-Butanol, which is soluble only to a limited extent in water, can be employed as the organic solvent. Obviously, similar alcohols, either partly soluble or practically insoluble in water, can be used, including isobutyl alcohol, pentanols, and hexanols. When the solvent selected is an ester of a monohydric alcohol and a fatty acid, the subsequent ease of removal from the fatty product is the primary consideration. When the organic solvent selected is a hydrocarbon, subsequent ease of removal from the fatty product by distillation or evaporation again is a primary consideration.

The following examples are provided to illustrate some of the preferred embodiments of the instant invention, and must not be construed as limiting the invention in any manner whatsoever.

EXAMPLE 1

Ten grams of commercial (purified grade) sodium oleate containing 1.79% free fatty acid was dissolved in 200 grams of warm 1-butanol (30°–50° C.). To this solution 175 ml of distilled water was added to form a sizable second phase. The mixture was placed in a 500 ml separatory funnel and $CO_2$ was passed through the water and alcohol phases at a rate sufficient to thoroughly mix them. After thorough mixing and saturation of the two phases with $CO_2$, the passage of $CO_2$ was stopped, the two liquid phases were allowed to separate, and the water phase was drawn off. Two more $CO_2$-water washings were performed. The three washings were combined and the water was evaporated to leave 1.5779 g of solids. Evaporation of the 1-butanol from the 1-butanol fraction left a fatty residue which analyzed 86.9% free fatty acid, calculated as oleic acid.

As a further control 5 g of the original commercial sodium oleate mentioned in the preceding paragraph was suspended in water and acidified with hydrochloric acid to a pH of 2 to 3. The fatty component of the acidulated mixture was extracted with hexane, the hexane solution was washed with water to remove hydrochloric acid, and the fatty component was recovered. The fatty component analyzed 100.86% free fatty acid, calculated as oleic acid.

EXAMPLE 2

The process and quantities of Example 1 were repeated; however, warm ethyl acetate (an ester) at about 30°–50° C. was used in place of the warm 1-butanol. The dried residue recovered from the aqueous layer amount to 0.9152 g. The fatty material recovered from the ethyl acetate layer amounted to 9.0366 g and titrated as 101.15% free fatty acid, calculated as oleic acid.

EXAMPLE 3

The process and quantities of Example 1 were repeated, but hexane (a hydrocarbon) at about 30°–50° C. was used in the place of the warm 1-butanol. The dried residue recovered from the aqueous layer amounted to 1.9145 g. Evaporation of the hexane from the hexane layer yielded 9.0025 g residue, which analyzed 97.66% free fatty acid, calculated as oleic.

EXAMPLE 4

Six grams of sodium oleate was added to a mixture containing 200 grams of refined and bleached cottonseed oil free of soaps, 200 grams of 1-butanol, and 150 ml of water. This mixture was washed four times with $CO_2$-saturated water. The 1-butanol oil phase was collected and the butanol was removed by vacuum distillation. The cottonseed oil recovered from the 1-butanol phase was analyzed for content of soaps by a titration with hydrogen bromide in glacial acetic acid as described by Feuge, Zerins, and White in the Journal of American Oil Chemists Society. vol. 48, page 87A (1971). The content of free soaps in the $CO_2$-treated cottonseed oil was found to be 0.46%, calculated as sodium oleate.

To provide a control, sodium oleate was mixed with cottonseed oil in the ratio of 6 g sodium oleate to 200 g of oil. An aliquot of this mixture was titrated for soap by the Feuge method and found to contain 3.22% soap, calculated as sodium oleate. The soap found amounted to 110.8% of the soap added, calculated as sodium oleate.

EXAMPLE 5

A quantity of 10.98 grams of crude sucrose ester product prepared by interesterification of sucrose with a mixture of mono-, di-, and tripalmitin in the presence of soaps consisting of 4 parts potassium oleate and 1 part lithium oleate (as described in U.S. Pat. No. 3,714,144) was dissolved in 150 ml of warm 1-butanol at about 30°-50° C. and 150 ml of distilled water. This mixture was placed in a separatory funnel and $CO_2$ was passed through the system. The 1-butanol phase was separated from the water phase and the water phase was washed once with 1-butanol while both phases were saturated with $CO_2$.

The two 1-butanol fractions were combined with the 1-butanol was removed by vacuum distillation. The residue of purified sucrose ester product amounted to 5.39 g. A portion of the purified sucrose ester product when mixed with aqueous ethanol had a pH of 7, whereas the crude ester product under the same conditions had a pH between 9 and 10. Atomic absorption analysis of the purified sucrose ester product indicated a potassium content of 0.14% which is equivalent to 1.15% potassium oleate. HBr titration for total soaps indicated a soap content equivalent to 2.09% potassium oleate.

To serve as a control, 10 grams of the crude sucrose ester product was mixed with distilled water and 1-butanol in a separatory funnel but was not treated with $CO_2$. The 1-butanol was separated from the aqueous fraction. The 1-butanol fraction on vacuum distillation left a dry residue which on titration with HBr was found to contain 19.53% soap, calculated as potassium oleate.

EXAMPLE 6

The quantity of 1.5779 grams of dried residue from the three residue water washings in Example 1 was formed into soaps in the following manner described below, thus proving that soap can be reformed from the alkali metal salt obtained as a by-product in the removal of soap by the instant invention.

A quantity of 4.46 grams of oleic acid was dissolved in 50 grams of absolute ethanol, and the 1.5779 grams of the above dry residue from the water washings was dissolved in 60 ml of distilled water. The two dissolved systems were mixed at approximately 80° C. and the water and ethanol removed by vacuum distillation. The dry residue obtained was dissolved in a mixture of 1-butanol and distilled water, and placed in a separatory funnel. The water phase was drawn off, and the 1-butanol phase was washed three times with water. The water phase and the water from the three washes were combined, and volatiles were distilled off under vacuum to leave a water-phase residue of 2.786 g, which in appearance resembled soap but possibly contained some inorganic salts. The 1-butanol phase was subjected to vacuum distillation and stripping with nitrogen to remove 1-butanol and other volatiles, leaving a residue of 2.281 g, which was free of inorganic salts. Portions of the residue from the 1-butanol phase were titrated with HBr and found to analyze 101.7% soap, calculated as sodium oleate.

We claim:

1. A process for purifying fatty acid ester products containing the salt of an alkali metal comprising:

(a) dissolving in a water-immiscible organic solvent at about 20°-50° C. a quantity of a fatty acid ester product which contains an alkali metal salt of a fatty acid;

(b) mixing the dissolved product solution with a quantity of water sufficient to form a second or aqueous phase;

(c) while the organic and aqueous phases are in contact with each other, mixing and saturating the two phases with carbon dioxide;

(d) separating the aqueous phase from the organic phase; then, (e) removing the solvent from the organic phase, thus obtaining a purified fatty acid ester product.

2. The process of claim 1 wherein the organic solvent of step (a) is selected from the group consisting of:

(a) an alcohol having at least 4 carbon atoms, (b) an ester of a monohydric alcohol and a fatty acid, said ester having less than 8 carbon atoms, and (c) an aliphatic hydrocarbon.

3. The process of claim 1 wherein the fatty product of step (a) is a sucrose ester.

4. The process of claim 1 wherein the fatty product of step (a) is a glyceride ester.

5. The process of claim 1 wherein the aqueous phase of step (d) is evaporated to eliminate or remove $CO_2$ from the aqueous phase and is reacted with fatty acids to form alkali metal salts for use as catalyst and solubilizer in interesterification reactions.

* * * * *